No. 754,680. PATENTED MAR. 15, 1904.
R. A. MOORE.
RUNNING GEAR FOR VEHICLES.
APPLICATION FILED APR. 9, 1903.
NO MODEL.
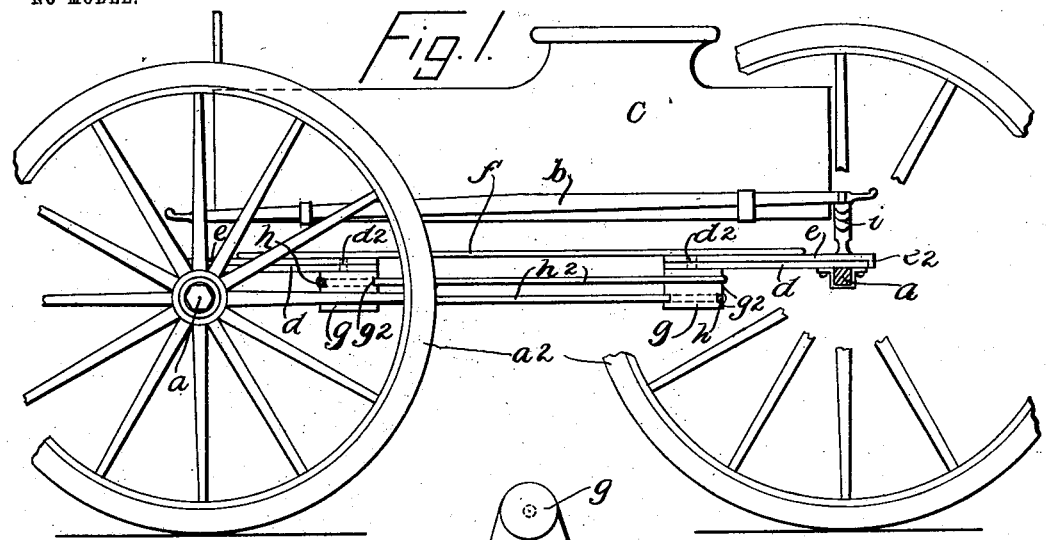
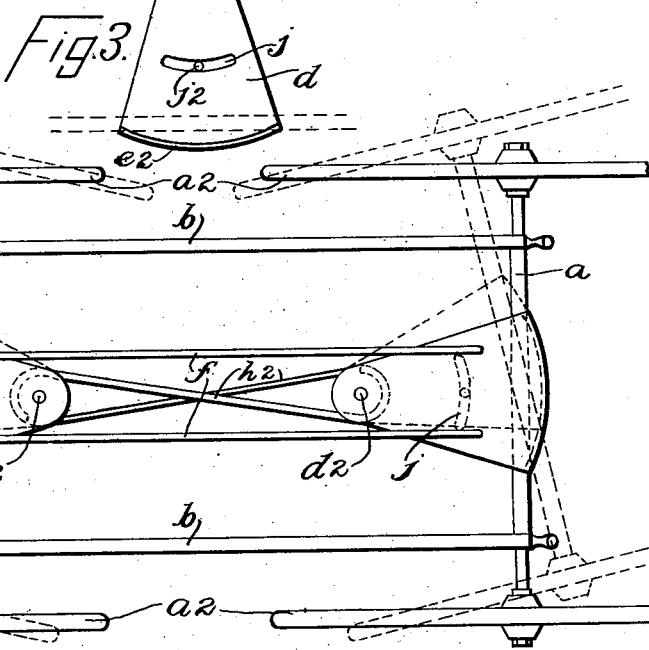
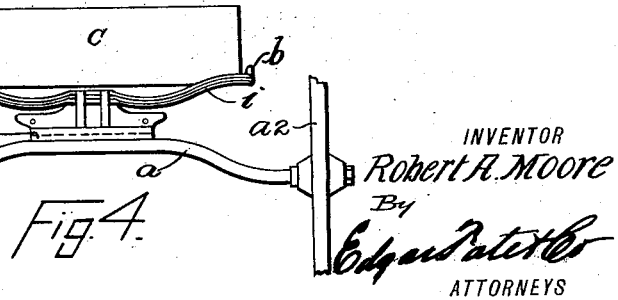
WITNESSES
S. L. Gottheimer
J. E. Larsen
INVENTOR
Robert A. Moore
By
Edgar Tate & Co
ATTORNEYS
THE NORRIS PETERS CO., PHOTO-LITHO., WASHINGTON, D. C.

No. 754,680. Patented March 15, 1904.

UNITED STATES PATENT OFFICE.

ROBERT ARCHIBALD MOORE, OF TORONTO, CANADA.

RUNNING-GEAR FOR VEHICLES.

SPECIFICATION forming part of Letters Patent No. 754,680, dated March 15, 1904.

Application filed April 9, 1903. Serial No. 151,695. (No model.)

*To all whom it may concern:*

Be it known that I, ROBERT ARCHIBALD MOORE, a citizen of the United States, residing at Toronto, in the county of York, Ontario, Canada, have invented certain new and useful Improvements in Running-Gear for Vehicles, of which the following is a specification, such as will enable those skilled in the art to which it appertains to make and use the same.

The object of this invention is to provide an improved running-gear for vehicles whereby a vehicle may be given a much shorter turning radius than is possible with ordinary running-gears, a further object being to provide an improved running-gear of the class specified particularly for use in connection with light vehicles—such as buggies, carriages, and other vehicles of this class—but which may also be applied to heavier vehicles, such as express-wagons, truck-wagons, &c.

The invention is an improvement on that described in another application for Letters Patent of the United States filed by me April 2, 1902, Serial No. 191,028, and is fully disclosed in the following specification, of which the accompanying drawings form a part, in which the separate parts of my improvement are designated by suitable reference characters in each of the views, and in which—

Figure 1 is a side view of an ordinary side-bar buggy provided with my improvement, part of one wheel being broken away and a part of the construction being shown in section; Fig. 2, a plan view thereof, the body of the buggy being removed; Fig. 3, a bottom plan view of a detail of the construction, and Fig. 4 a rear end view of the vehicle.

In the drawings forming part of this specification I have shown my improved running-gear applied to a side-bar buggy involving the usual axles $a$, the side-bars $b$, and the body $c$; but in Fig. 2 the body $c$ is removed, so as to more clearly show the running-gear, and in these views the axles are provided with the usual wheels $a^2$.

In the practice of my invention I secure to each of the axles $a$ a plate $d$, and these plates are preferably triangular in form, and the wider ends thereof are secured to axles, this connection being made in any desired manner, and the narrower ends extend inwardly toward the central portion of the running-gear or truck-frame of the vehicle. Over each of the plates $d$ and pivotally connected therewith at $d^2$ is placed a similar plate $e$, said plates being also wider at one end than at the other, and the outer or wider ends of the plates $e$ are segmental in form and preferably provided each with a downwardly-directed flange $e^2$, and these flanges overlap the outer ends of the plates $d$, which are also segmental in form.

The plates $e$ are rigidly connected by horizontal and parallel bars $f$, which are rigidly secured thereto, or these plates may be rigidly connected by any suitable means and rigidly connected with the bottom inner end portions of the plates $d$, and preferably formed integrally therewith are drums $g$, each of which is provided in the form of construction shown with two grooves $g^2$, arranged one above the other, and around these drums or partially around the same and secured thereto at $h$ are belts, bands, or cables $h^2$, preferably composed of steel and which are crossed between said drums, as clearly shown in Fig. 2.

Supported on the outer ends of the plates $e$ and connected therewith in any desired manner are springs $i$, which support the side-bars $b$, and the body $c$ is connected with the side-bars $b$ in the usual or any desired manner. As thus constructed it will be seen that the plates $d$ and $e$ are free to move or turn one upon the other, said plates being pivotally connected at $d^2$, and in the turning of the vehicle the axles $a$ will assume the position shown in dotted lines in Fig. 2, according to the direction in which it is desired to turn, and the turning radius of the vehicle will thus be greatly reduced.

In practice I also preferably form in one of the plates $d$ or $e$, and preferably in the plate $d$, a segmental recess $j$ and provide the other plate—the plate $e$, as shown in the drawings—with a pin $j^2$, movable in said slot, and this construction serves to limit the movement of one of said plates upon the other; but any suitable means may be provided to accomplish this result.

The side-bars $b$ are of course not necessary, and the ends of the body $c$ may be directly connected with the ends of the springs $i$, or this connection of the body $c$ with the springs $i$ may be made in any desired manner.

It will be seen that the plates $e$ and bars $f$ constitute a rigid frame, on which the upper parts of the vehicle are supported, and this frame also binds the axles and other parts of the running-gear together, while permitting the axles to turn in the manner described.

It will be understood that in practice one of the axles is provided with the usual shaft or shafts, and a single horse or two horses may be employed, or the vehicle may be of the motor class, and if either axle be turned, as shown in dotted lines in Fig. 3, the other will assume the corresponding position shown in dotted lines in said figure, and this movement of the second axles is occasioned by the belts, bands, or cables $h^2$, which pass around the drums $g$ and are secured thereto at the opposite and outer sides thereof.

The object of using two of the belts, bands, or cables $h^2$ is to place one of them above the other, so that they will not interfere or make contact where they cross in the middle of the truck-frame; but it will be apparent that this object may be accomplished in other ways, and a single belt, band, or cable may be employed, and the grooves $g^2$ in the drums $g$ may be so formed as to permit of the use of a single belt, band, or cable without the separate sides thereof coming in contact in the middle of the truck-frame.

This running-gear is exceedingly simple in construction and may be made as strong as desired and is not liable to get out of order or frequently need repair and by means thereof a vehicle may be turned in a comparatively small space and with comparatively slight trouble to the driver or manipulator.

Having fully described my invention, what I claim as new, and desire to secure by Letters Patent, is—

1. The combination with the axles of a vehicle of plates rigidly connected therewith and extending inwardly in the direction of the center of the truck-frame, a rigid longitudinal frame provided with end plates which rest on the first-named plates and which are pivotally connected therewith at their inner ends, drums secured to the bottom portions of the first-named plates at the inner ends thereof and belts or cables secured to and passing around said drums and crossed between the same, substantially as shown and described.

2. The combination with the axles of a vehicle of plates rigidly connected therewith and extending inwardly in the direction of the center of the truck-frame, a rigid longitudinal frame provided with end plates which rest on the first-named plates and which are pivotally connected therewith at their inner ends, drums secured to the bottom portions of the first-named plates at the inner ends thereof and belts or cables secured to and passing around said drums and crossed between the same, said rigid frame forming a support for the upper parts of the vehicle, substantially as shown and described.

In testimony that I claim the foregoing as my invention I have signed my name, in presence of the subscribing witnesses, this 6th day of April, 1903.

ROBERT ARCHIBALD MOORE.

Witnesses:
MARTHA KENNING,
SAMUEL CLEMENT SMOKE.